(12) United States Patent
Simmons

(10) Patent No.: US 11,197,427 B2
(45) Date of Patent: Dec. 14, 2021

(54) AGRICULTURAL BALER WITH EXCESSIVE WRAP DETECTION

(71) Applicant: CNH Industrial America LLC, New Holland, PA (US)

(72) Inventor: Scott C. Simmons, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 139 days.

(21) Appl. No.: 16/584,080

(22) Filed: Sep. 26, 2019

(65) Prior Publication Data

US 2021/0092904 A1 Apr. 1, 2021

(51) Int. Cl.
| | | |
|---|---|---|
| *A01F 15/07* | (2006.01) | |
| *A01F 15/14* | (2006.01) | |
| *B30B 9/30* | (2006.01) | |
| *A01F 15/12* | (2006.01) | |

(52) U.S. Cl.
CPC ........ *A01F 15/0715* (2013.01); *A01F 15/148* (2013.01); *B30B 9/3007* (2013.01); *A01F 15/12* (2013.01); *A01F 2015/072* (2013.01); *A01F 2015/076* (2013.01)

(58) Field of Classification Search
CPC .... A01F 15/07; A01F 15/0715; A01F 15/148; A01F 15/12; A01F 2015/072; A01F 2015/076; B65B 13/02; B65B 41/12; B65B 57/04; B30B 9/3007
See application file for complete search history.

(56) References Cited

U.S. PATENT DOCUMENTS

| | | |
|---|---|---|
| 4,697,402 A | 10/1987 | Anstey et al. |
| 5,388,504 A | 2/1995 | Kluver |
| 5,551,218 A | 9/1996 | Henderson et al. |
| 5,581,976 A | 12/1996 | Underhill |
| 6,295,797 B1 | 10/2001 | Naaktgeboren et al. |
| 6,644,006 B1 | 11/2003 | Merritt et al. |
| 6,688,092 B2 | 2/2004 | Anstey et al. |

(Continued)

FOREIGN PATENT DOCUMENTS

| | | |
|---|---|---|
| EP | 0252457 A1 | 1/1988 |
| WO | 2012/131664 A1 | 10/2012 |

OTHER PUBLICATIONS

Extended European Search Report for EP Application No. 20196626.4 dated Feb. 22, 2021 (six pages).

*Primary Examiner* — Jimmy T Nguyen
(74) *Attorney, Agent, or Firm* — Peter Zacharias; Patrick Sheldrake

(57) ABSTRACT

A wrapping system includes: a material roll configured to hold a roll of wrapping material; a knife assembly comprising a movable knife that is configured to cut wrapping material that comes off the material roll; a sensor associated with the material roll and configured to output a drawn material signal; and a controller. The controller is configured to: receive the drawn material signal; determine a length of wrapping material that is drawn from the material roll; output a cut signal to the knife assembly when the drawn length of wrapping material reaches a defined length; determine a length of wrapping material that is drawn from the material roll after outputting the cut signal; and output an excessive wrap signal when the length of wrapping material drawn after outputting the cut signal exceeds a threshold length.

13 Claims, 7 Drawing Sheets

(56) References Cited

U.S. PATENT DOCUMENTS

| | | | |
|---|---|---|---|
| 6,877,304 | B1 | 4/2005 | Smith et al. |
| 6,966,162 | B2 | 11/2005 | Viaud et al. |
| 7,278,251 | B2 | 10/2007 | Paillet et al. |
| 8,011,295 | B1 | 9/2011 | Smith et al. |
| 8,973,339 | B2 | 3/2015 | Vandamme |
| 9,089,095 | B2 | 7/2015 | Martin et al. |
| 9,560,808 | B2 | 2/2017 | Foster et al. |
| 2008/0034984 | A1* | 2/2008 | Olander ............... B65B 27/125 100/4 |
| 2016/0113204 | A1* | 4/2016 | Rosseel ................. B65B 41/12 53/167 |
| 2017/0327260 | A1 | 11/2017 | Lancaster, III et al. |

* cited by examiner

AGRICULTURAL BALER WITH EXCESSIVE WRAP DETECTION

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional baling chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A knife or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

Wrapping the bale in material helps maintain the shape of the formed bale and protect the bale from, for example, rain or other harmful external conditions. However, wrapping the bale with too little or too much wrapping material can also be harmful. Excessively wrapping the bale provides little, if any, benefit and wastes wrapping material, which can reduce the amount of time the baler can operate before needing to replace the wrapping material roll.

What is needed in the art is a baler that can address at least some of the previously described issues with known balers.

SUMMARY OF THE INVENTION

Exemplary embodiments disclosed herein provide a wrapping system with a controller that is configured to determine when a length of wrapping material drawn from a material roll exceeds a threshold length and output an excessive wrap signal.

In some exemplary embodiments provided according to the present disclosure, a wrapping system for an agricultural baler includes: a material roll configured to hold a roll of wrapping material; a knife assembly comprising a movable knife that is configured to cut wrapping material that comes off the material roll; a sensor associated with the material roll and configured to output a drawn material signal that is indicative of wrapping material being drawn from the material roll; and a controller operatively coupled to the knife assembly and the sensor. The controller is configured to: receive the drawn material signal; determine a length of wrapping material that is drawn from the material roll; output a cut signal to the knife assembly when the drawn length of wrapping material reaches a defined length; determine a length of wrapping material that is drawn from the material roll after outputting the cut signal; and output an excessive wrap signal when the length of wrapping material drawn after outputting the cut signal exceeds a threshold length.

In some exemplary embodiments provided according to the present disclosure, an agricultural baler includes: a chassis; a baling chamber carried by the chassis and configured to form a bale; and a wrapping system configured to wrap a formed bale in the baling chamber. The wrapping system includes: a material roll configured to hold a roll of wrapping material; a knife assembly comprising a movable cutter that is configured to cut wrapping material that comes off the material roll; a sensor associated with the material roll and configured to output a drawn material signal that is indicative of wrapping material being drawn from the material roll; and a controller operatively coupled to the knife assembly and the sensor. The controller is configured to: receive the drawn material signal; determine a length of wrapping material that is drawn from the material roll; output a cut signal to the knife assembly when the drawn length of wrapping material reaches a defined length; determine a length of wrapping material that is drawn from the material roll after outputting the cut signal; and output an excessive wrap signal when the length of wrapping material drawn after outputting the cut signal exceeds a threshold length.

In some exemplary embodiments provided according to the present disclosure, a method of controlling a wrapping system of an agricultural baler is provided. The method is performed by a controller and includes: determining a length of wrapping material that is wrapped around a bale in a baling chamber; outputting a cut signal to a knife assembly when the drawn length of wrapping material reaches a defined length; determining a length of wrapping material that is wrapped around the bale after outputting the cut signal; and outputting an excessive wrap signal when the length of wrapping material wrapped around the bale after outputting the cut signal exceeds a threshold length.

One possible advantage that may be realized by exemplary embodiments disclosed herein is that the controller can detect when the wrapping assembly is not functioning properly by determining that excess wrapping material is being applied to the bale after outputting the cut signal.

Another possible advantage that may be realized by exemplary embodiments disclosed herein is that the controller can stop further wrapping of the bale after detecting that an excessive amount of wrapping material has been wrapped around the bale.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
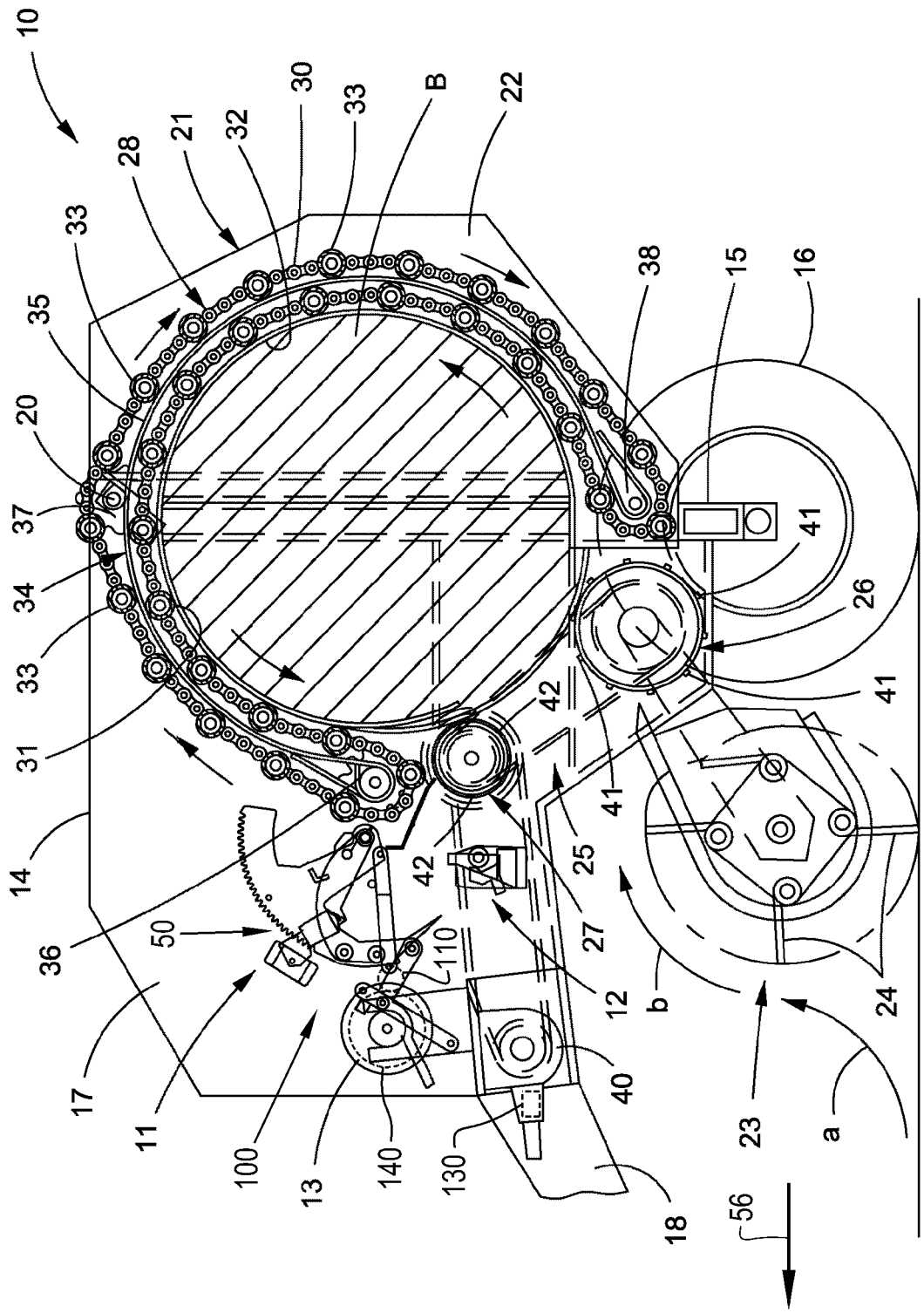
FIG. 1 illustrates a sectional view of an exemplary embodiment of an agricultural baler including a wrapping system, provided in accordance with the present disclosure.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown).

FIG. 1 illustrates a fixed chamber round baler 10 having a wrapping system 100 for wrapping a cylindrical package of crop material (not shown) formed in a round baler 10. More particularly, the wrapping system 100 of baler 10 comprises a wrapping assembly 11 and a knife assembly 12 that includes a movable knife 60 for cutting wrapping material, such as net, issued from a material roll 13.

As shown, round baler 10 includes a chassis 14 with a main support beam 15 on which a pair of wheels 16 (only one shown) are rotatably affixed. The chassis carries a cylindrical baling chamber including sidewalls 17. For the purposes of clarity only one wall 17 is shown in FIG. 1 and the elements mounted inwardly thereof are shown in full lines for clarity. For illustrative purposes reference letter B is used to designate a bale, shown in cross section in the chamber.

Baler 10 also includes a tongue 18 extending from the forward portion of chassis 14 for conventional connection to a tractor (not shown). Pivotally connected to the sidewalls of chassis 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on chassis 14 in a suitable manner includes a plurality of fingers or tines 24 movable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on chassis 14 between sidewalls 17.

As shown, the baling chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The baling chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the baling chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2:
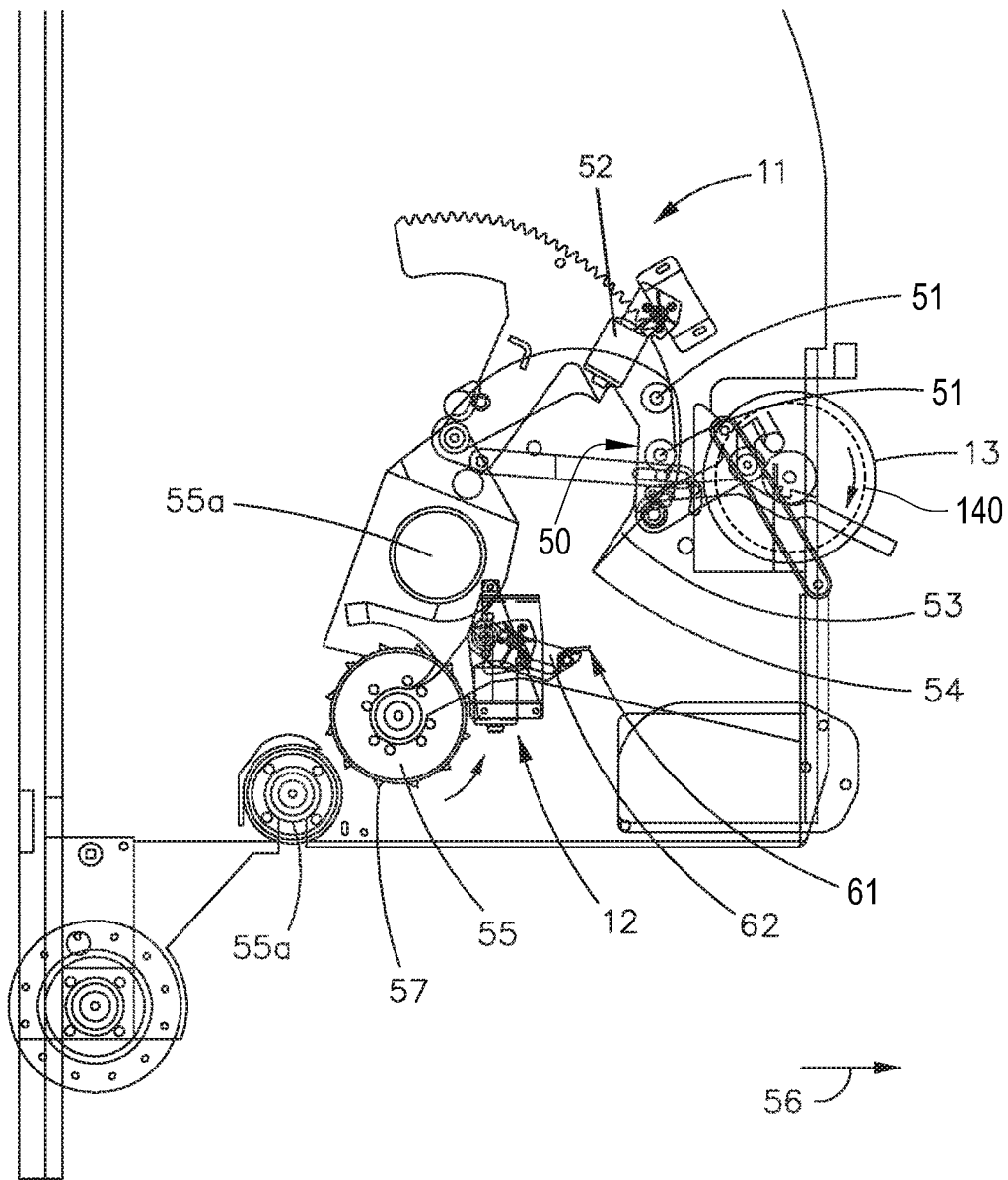
FIG. 2 illustrates a side view of an exemplary embodiment of a wrapping assembly with a duckbill in a home position.
Figure 3:
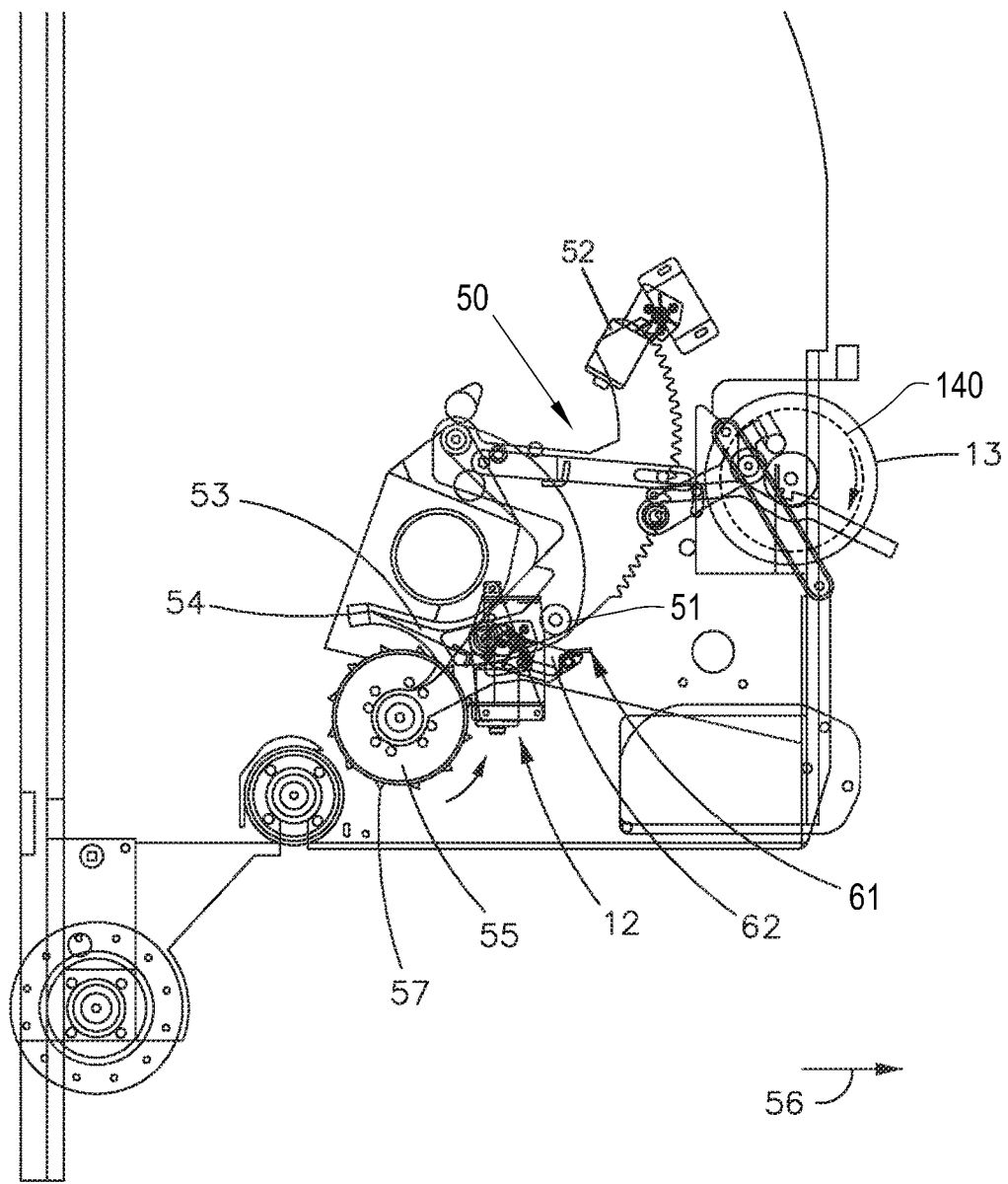
FIG. 3 illustrates a cross-sectional view of the wrapping assembly of FIG. 2 with the duckbill in an insert position.
Figure 4:
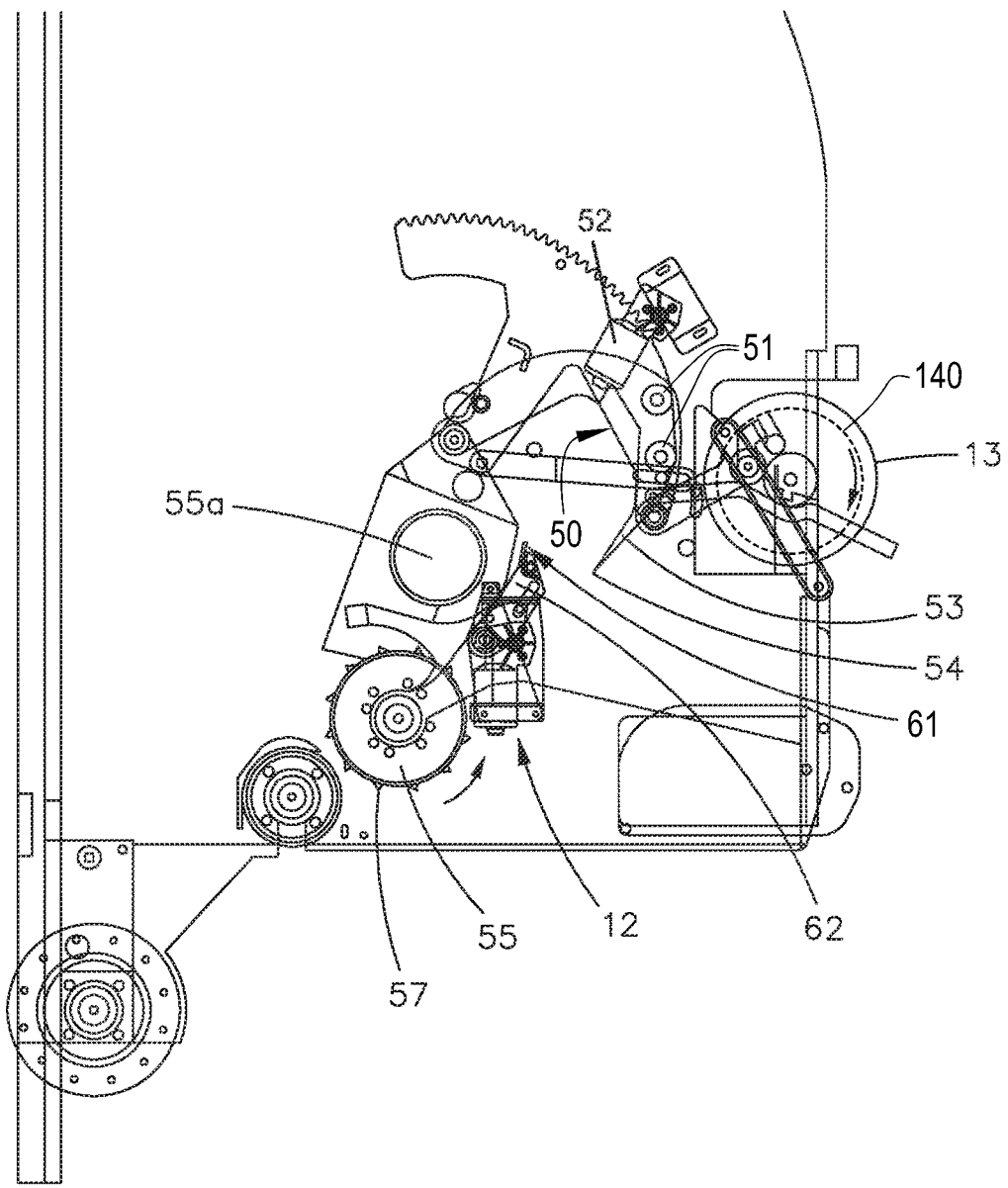
FIG. 4 illustrates a side view of the wrapping assembly of FIGS. 2-3 and a knife assembly in a cut position.

FIGS. 2-4 show an exemplary embodiment of the wrapping system 100 provided according to the present disclosure and comprising wrapping assembly 11 and knife assembly 12. As shown, the wrapping assembly 11 includes a material roll 13, a duckbill assembly 50 including at least one duckbill roll, illustrated as multiple duckbill rolls 51, carried by a duckbill 53, and a duckbill actuator 52 coupled to the duckbill 53. Bale chamber rolls 55 facilitate the forming of the bale and wrapping of the bale with the net. (Reference numeral 55a is used to denote the location of the axis of a bale chamber roll, which is not shown, for clarity.) The knife assembly 12 may include a movable knife 60 and a knife duckbill 62 for moving the knife 60.

The wrapping assembly 11, including the duckbill assembly 50 and its associated structure and mechanisms may be conventional and common to the structure and operation described in the baler patents referenced and incorporated herein by reference above.

As shown, the wrapping material, such as net, may be fed from the material roll 13 and travel over the duckbill rolls 51 and exit a tip 54 of the duckbill 53. The tip 54 of the duckbill 53 serves to pinch the net and prevent the net from snapping back through the duckbill 53 once it is cut. Typically, a portion of net will extend out of the tip after a net knife action. For example, it is common for a section of net that hangs out of the tip of the duckbill and that net tail is where it grabs on to the bale when the duckbill 53 is inserted for the next net wrapping cycle.

As shown, the duckbill actuator 52 may be dedicated to the duckbill 53, and operation of the duckbill actuator 52 functions to insert the duckbill 53 to commence a net wrapping cycle and then to retract the duckbill 53 at the end of the wrapping cycle once the net has been cut. The duckbill actuator 52 is thus configured to move the duckbill 53 between a first position, which may be an insert position, and a second position, which may be a home position, during retraction of the duckbill 53. The duckbill actuator 52 may be, for example, a motor that is powered by electricity, hydraulics, and/or pneumatics, as is known. The duckbill rolls 51 function to define the path of the net as it weaves through the duckbill assembly 50 and to ensure the net is stretched to one side of the bale to the other side of the bale. In the operation of the illustrated wrapping assembly 11, the net comes off the bottom of the material roll 13, which, in the figure, rotates clockwise, and goes around the upper side of the upper duckbill roll 51 and then makes essentially an 180-degree turn and then goes on the material roll side of the lower duckbill roll 51 and then through the tip 54 of the duck bill 53. The rotational direction of the material roll 13 is unimportant, but ultimately determines the location where the net leaves the roll, and/or the number and placement of additional rolls needed to direct the net appropriately to the duckbill, and eventually rearward, toward the baling chamber. The front of the baler is indicated by arrow 56.

The bale chamber roll 55 closest to the up-cut knife assembly 12 may include ribs 57 disposed about the outside of the roll. A bale chamber roller 55 positioned above this roller (not shown) may also include ribs. A gap or clearance may be formed between these two bale chamber rollers 55 to allow access for the tip 54 of the duckbill 53. As the bale chamber roll 55 rotates, the net pinches between the rolls and the bale and ribs 57 help grabs the net and feed it into the bale chamber and onto the bale. In the illustrated embodiment, the bale may rotate such that the top material moves forward and downward, with respect to the baler, clockwise as shown in the figure, in the chamber and the bale chamber rolls 55 rotate in the opposite direction, here counterclockwise.

FIG. 2 illustrates the wrapping assembly 11 and the knife assembly 12 in the home position. FIG. 3 illustrates the duckbill 53 in the insert position. FIG. 4 illustrates the wrapping assembly 11 again in the home position with the knife assembly 12 in the cut position.

During a net wrapping cycle, the wrapping assembly 11 moves through two positions: the home position to the insert position and back to the home position. In the home position (FIG. 2), the duckbill 53 of the wrapping assembly 11 is in the raised or home position. The home position is typically employed at the time a bale is being formed. At some point in time, the bale forming operation is completed and the time to wrap the bale occurs. At this time, the duckbill 53 of the wrapping assembly 11 is lowered to the insert position (FIG. 3), where the duckbill 53 rotates into the baling chamber. The duckbill tip 54 fits in between upper and lower bale chamber rolls 55 (the upper roll is not shown for clarity, but its location is marked 55*a*), and the net is pinched between the bale and the lower roll causing the net to start to feed on to the bale. Sensors (not shown) may be provided to determine when the net is flowing on to the bale. Once it is determined that the net has started wrapping on the bale, the duckbill 53 is retracted out of the bale chamber and returns to the duckbill home position (FIG. 4). Completion of the net wrapping may be determined using sensors and/or via passage of a specified time period. At this point in the net wrapping cycle, the net is still flowing out of the duckbill 53 to the bale chamber. It is also time to cut the net, the operation of which is performed by the knife assembly 12 moving the knife 60 to the cut position.

Figure 5:
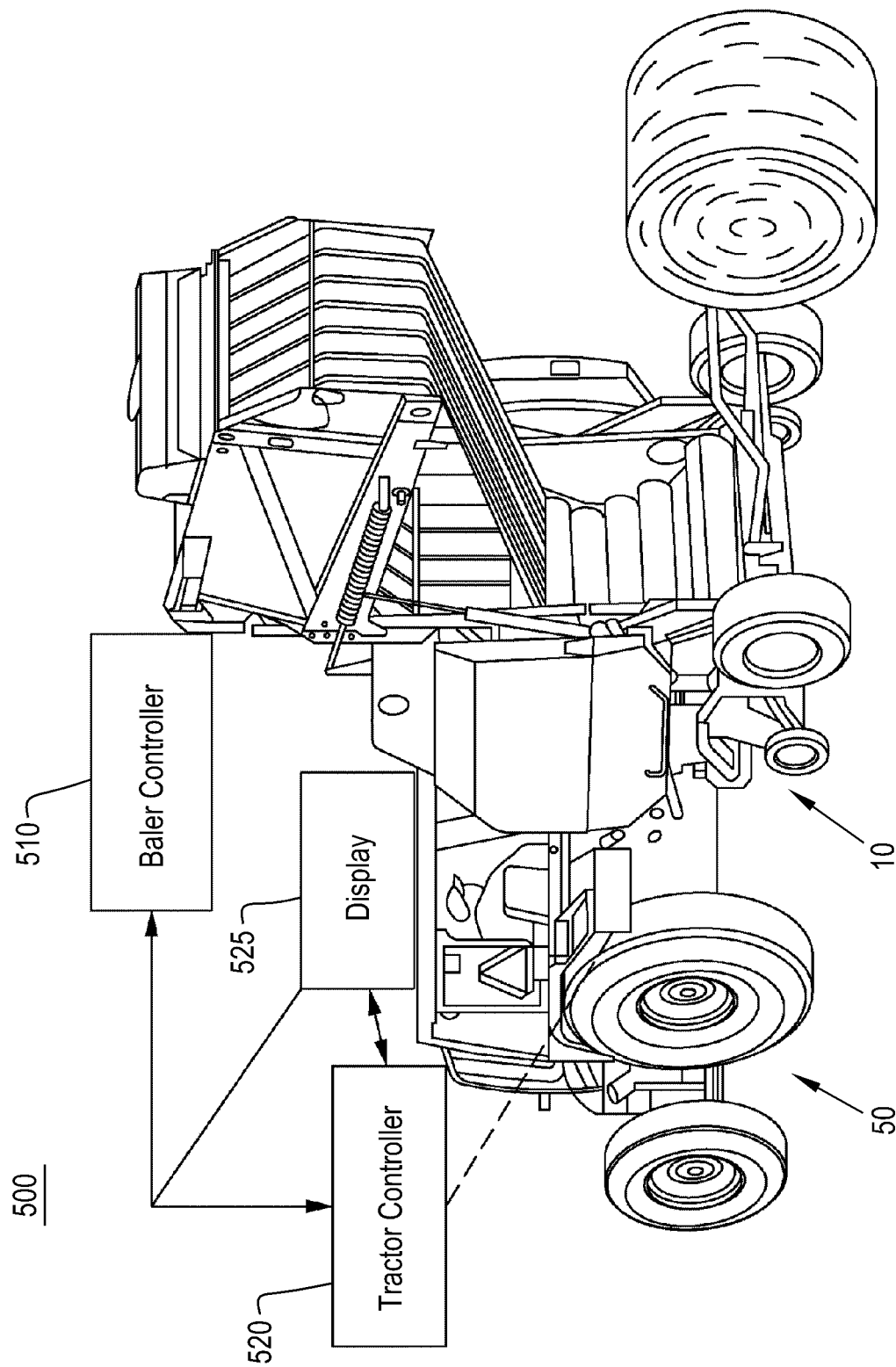
FIG. 5 illustrates a perspective view of a tow vehicle towing the baler of FIG. 1.

FIG. 5 illustrates an exemplary embodiment of a baling system 500 provided according to the present disclosure. The baling system 500 includes the baler 10 with a baler controller 510 and a tractor 50 with a tractor controller 520 and a display 525 accessible by an operator in the tractor 50. The display 525 allows for the operator to see various control and status information as well as to enter and configure information for use by the tractor controller 520 and the baler controller 510. The tractor controller 520 and the baler controller 510 are operatively coupled to one another for messaging and data communication, as is known. The display 525 is operatively coupled to the tractor controller 520 and may be operatively coupled to the baler controller 510 directly or indirectly through the tractor controller 520. In some embodiments, the tractor controller 520 and the baler controller 510 are integrated in an ISO-BUS system; in such embodiments, the controllers 510, 520 may communicate on the ISOBUS network. It should thus be appreciated that an ISOBUS network may also be the "controller" referred to herein.

In other embodiments, the baler 10 is not connected to the tractor 50 but is connected to other equipment, such as, for example, a harvester or a part of a harvester, such as a cotton picker, or the like. In these embodiments, the other equipment (e.g., harvester) may include a controller, similar to the tractor controller 520, and an operator interface, similar to the display 525.

In known balers, the controller normally signals for a wrapping cycle to begin after determining that the formed bale has reached a certain size. Once the wrapping cycle begins and wrapping material is wrapped around the bale, the controller can, for example, keep track of how much time has elapsed before signaling for the knife assembly to cut the wrapping material. It has been found that this is not effective in situations where the knife assembly does not fully cut through the wrapping material, which may be due to the motor that moves the knife stalling or the knife not being sharp enough to cut the material. In such instances, the material roll may continue to rotate and apply an excessive amount of wrapping material to the bale or, in some cases, the bale may be ejected without the wrapping material being fully cut. If the wrapping material is not fully cut, the bale can pull wrapping material from the material roll when released to the field. In either scenario, an excess of wrapping material is pulled from the material roll, resulting in wasted material and time.

To address some of the previously described issues, and referring to FIG. 1 again, the wrapping system 100 includes a sensor 110 that is associated with the material roll 13 and a controller that is operatively coupled to the knife assembly 12 and the sensor 110. The controller may be, for example, the baler controller 510, the tractor controller 520, a separate dedicated controller, and/or an ISOBUS network that incorporates the controllers 510, 520. For ease of description, the baler controller 510 is hereafter referred to as "the controller," but it should be appreciated that the controller provided according to the present disclosure can be a variety of different controllers. The sensor 110 is configured to output a drawn material signal that is indicative of wrapping material being drawn from the material roll. For example, the sensor 110 may comprise a wheel that wrapping material travels across as the wrapping material is drawn from the material roll 13. As the wrapping material is drawn from the material roll 13 across the sensor 110, the sensor 110 rotates and outputs the drawn material signal during rotation. In some embodiments, the sensor 110 is configured to output the drawn material signal after a rotation interval so the controller 510 is able to keep track of how many revolutions the sensor 110 has undergone and keep track of the length of material that has been drawn from the material roll. For example, the sensor 110 may be configured to output the drawn material signal every 10° of rotation, so the controller 510 can determine that each output drawn material signal corresponds to a length of wrapping material being drawn that is equal to a circumference of the sensor 110 divided by 36. It should be appreciated that many other types of sensors can be utilized to output the drawn material signal, such as optical sensors, and the foregoing description of a sensor 110 comprising a wheel is exemplary only.

The controller 510 is configured to receive the drawn material signal and determine a length of wrapping material that is drawn from the material roll. The controller 510 can determine the length of wrapping material that is drawn from the material roll as previously described, or in other ways. When the drawn length of wrapping material reaches a defined length, the controller 510 outputs a cut signal to the knife assembly 12 to signal for the knife assembly 12 to move into position and cut the wrapping material. The controller 510 determines a length of wrapping material that is drawn from the material roll 13 after outputting the cut signal. When the length of wrapping material drawn after the controller 510 outputs the cut signal exceeds a threshold length, the controller 510 outputs an excessive wrap signal.

Outputting the excessive wrap signal from the controller 510 can result in a variety of different functions. In some embodiments, the controller 510 is configured such that the output excessive wrap signal prevents rotation of the material roll 13. Preventing rotation of the material roll 13 may be accomplished, for example, by the controller 510 outputting the excessive wrap signal to an operatively coupled power take off (PTO) 130 such that the output excessive wrap signal causes the PTO 130 to decouple from a power source, such as a corresponding shaft of the tractor 50, to prevent rotation of the material roll 13. The PTO 130 may be the primary source of power for the baler 10 or, alternatively, may be a secondary PTO that provides power to the material roll 13 to rotate the material roll 13. Alternatively, the controller 510 can be operatively coupled to a brake 140 that is associated with the material roll 13 and can apply a braking force to the material roll 13 to prevent rotation of the material roll 13. It should thus be appreciated that the excessive wrap signal output by the controller 510 can prevent rotation of the material roll 13 in a variety of ways.

Figure 6:
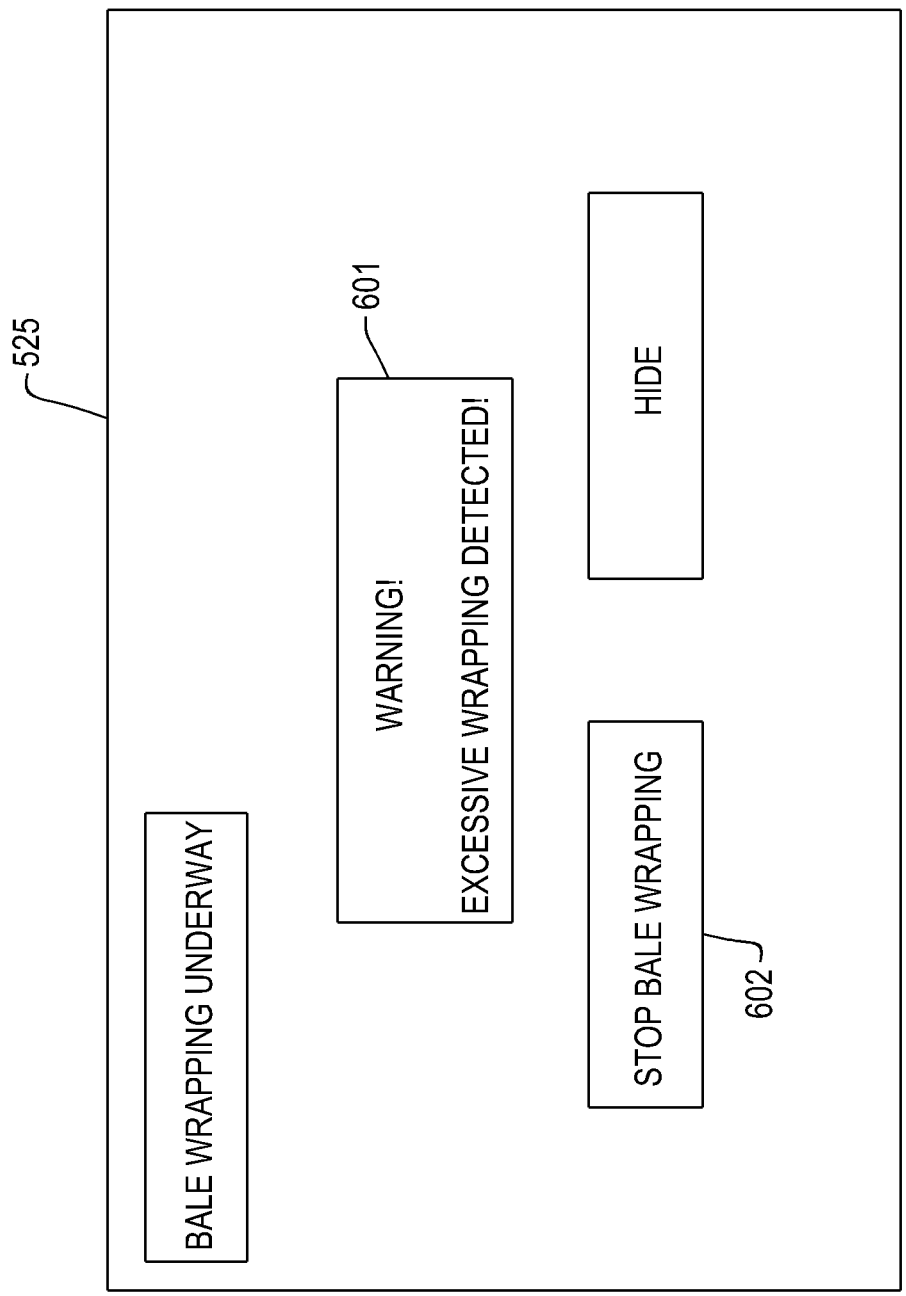
FIG. 6 illustrates an exemplary graphical user interface presented on a display after receiving an excess length signal.

In some embodiments, the controller 510 is configured to output the excessive wrap signal such that an alarm is trigged. The alarm being triggered may be alternatively, or in addition, to rotation of the material roll 13 being prevented when the excessive wrap signal is output. Referring specifically to FIG. 6, the controller 510 can be configured to operatively couple to the display 525 and output the excessive wrap signal to the display 525 to cause the display 525 to present a warning. The warning may be, for example, in the form of a warning graphic 601 that is presented on the display 525 and alerts an operator to excessive wrapping material being drawn from the material roll 13 without being cut. The excessive output signal may also cause the display 525 to present a stop wrapping icon 602 that, when selected, causes the display 525 to output a stop wrapping signal, to the controller 510 or elsewhere, that causes wrapping of the bale to terminate. In some embodiments, the triggered alarm is an audible alarm, rather than a visual one, that warns an operator that excessive wrapping material is being drawn from the material roll 13. It should thus be appreciated that an operator can be alerted to excessive wrapping material being wrapped around the bale in a variety of ways.

In some embodiments, the controller 510 is configured to set the threshold length. The threshold length may be set, for example, to be equal to a circumference of the forming bale. Making the threshold length equal to a circumference of the bale forming in the baling chamber can allow the controller 510 to determine when a substantial amount of excess wrapping material is wrapped around the bale, rather than a small amount, and take the appropriate responsive action. It should be appreciated that the threshold length may be set to other values by the controller 510, either automatically or due to a manual input by an operator, to determine when an excessive length of wrapping material has been drawn from the material roll 13 after outputting the cut signal.

In some embodiments, the controller 510 is configured to output a wrapping cycle start signal to the duckbill actuator 52 and determine the length of wrapping material that is drawn from the material roll 13 after outputting the wrapping cycle start signal. Outputting the wrapping cycle start signal to the duckbill actuator 52 can indicate that a wrapping cycle is beginning and act as the starting point for the controller 510 to determine the length of wrapping material being drawn from the material roll 13. After outputting the cut signal, the controller 510 no longer receiving the drawn material signal indicates that the knife assembly 12 has cut through the drawn wrapping material so wrapping material is no longer being drawn from the material roll 13 and the wrapping cycle has completed. The controller 510 can then reset wrapping cycle monitoring in anticipation of another wrapping cycle starting. However, the controller 510 continues to receive the drawn material signal as long as wrapping material is drawn from the material roll 13, allowing the controller 510 to keep track of the length of wrapping material drawn from the material roll 13 after outputting the cut signal and determine that excessive amounts of wrapping material have been drawn from the material roll 13.

From the foregoing, it should be appreciated that the controller 510 determining the length of wrapping material that is drawn from the material roll 13 after outputting the cut signal allows the controller 510 to determine how much wrapping material, if any, is drawn after the wrapping cycle should have ended. If the amount of wrapping material drawn from the material roll 13 exceeds the threshold length after the controller 510 outputs the cut signal, this indicates that the knife assembly 12 has failed to cut the wrapping material and excess wrapping material is being wrapped around the bale. The controller 510 may then output the excessive wrap signal to prevent further rotation of the material roll 13 and/or trigger an alarm to alert an operator that excessive wrapping material is being applied. In either scenario, the controller 510 can reduce the risk of excessive wrapping material being applied, reducing the risk of wasting wrapping material and time.

Figure 7:
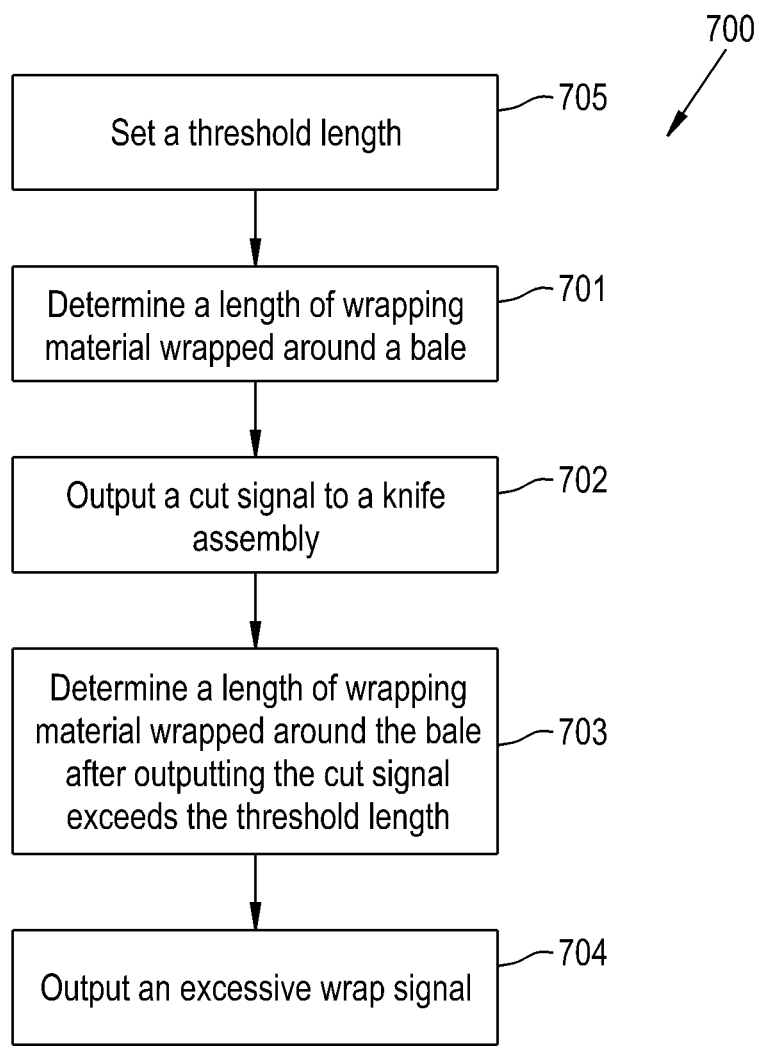
FIG. 7 is a flowchart illustrating an exemplary embodiment of a method of controlling a wrapping assembly of an agricultural baler, provided in accordance with the present disclosure.

Referring now to FIG. 7, an exemplary embodiment of a method 700 of controlling a wrapping system 100 of an agricultural baler 10 provided according to the present disclosure is illustrated. The method 700 is performed by a controller, such as the baler controller 510, the tractor controller 520, another controller, and/or an ISOBUS network and includes determining 701 a length of wrapping material that is wrapped around a bale in a baling chamber. The controller 510 outputs 702 a cut signal to a knife assembly 12 when the drawn length of wrapping material reaches a defined length. The controller 510 determines 703 a length of wrapping material that is wrapped around the bale after outputting the cut signal. The controller 510 outputs 704 an excessive wrap signal when the length of wrapping material wrapped around the bale after outputting 702 the cut signal exceeds a threshold length, as previously described. In some embodiments, outputting 704 the excessive wrap signal prevents further wrapping of wrapping material around the bale. The excessive wrap signal may prevent further wrapping by, for example, causing a PTO 130 to decouple from a power source or by causing a brake 140 to apply sufficient braking force to the material roll 13 to prevent rotation of the material roll 13. In some embodiments, outputting 704 the excessive wrap signal triggers an alarm. The alarm may be a warning graphic 601 presented on a display 525 and/or an audible alarm. The controller 510 may also both cause prevention of further rotation of the material roll 13 and cause triggering of an alarm. In some embodiments, the method 700 further includes setting 705 the threshold length. The threshold length may be set 705 to be equal to, for example, a circumference of the bale in the baling chamber.

It is to be understood that the steps of the method 700 are performed by the controller 510, 520 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 510, 520 described herein, such as the method 700, is implemented in software code or instructions which are tangibly stored on a tangible computer readable medium. The controller 510, 520 loads the software code or instructions via a direct interface with the computer readable medium or via a wired and/or wireless network. Upon loading and executing such software code or instructions by the controller 510, 520, the controller 510, 520 may perform any of the functionality of the controller 510, 520 described herein, including any steps of the method 700 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A wrapping system for an agricultural baler, comprising:
    a material roll configured to hold a roll of wrapping material;
    a knife assembly comprising a movable knife that is configured to cut wrapping material that comes off the material roll;
    a sensor associated with the material roll and configured to output a drawn material signal that is indicative of wrapping material being drawn from the material roll; and
    a controller operatively coupled to the knife assembly and the sensor, the controller being configured to:
        receive the drawn material signal;
        determine a length of wrapping material that is drawn from the material roll;
        output a cut signal to the knife assembly when the drawn length of wrapping material reaches a defined length;
        determine a length of wrapping material that is drawn from the material roll after outputting the cut signal; and
        output an excessive wrap signal when the length of wrapping material drawn after outputting the cut signal exceeds a threshold length, wherein the controller is configured such that the output excessive wrap signal prevents rotation of the material roll, and wherein the controller is configured in response to said excessive wrap signal to set the threshold length to be equal to a circumference of a forming bale or to prevent rotation of the material roll by decoupling of a power take off from a power source.

2. The wrapping system of claim 1, wherein the controller is configured to output the excessive wrap signal such that an alarm is triggered.

3. The wrapping system of claim 2, wherein the controller is configured to operatively couple to a display and output the excessive wrap signal to the display to cause the display to present a warning.

4. The wrapping system of claim 1, wherein the sensor comprises a wheel that is configured to rotate as wrapping material is drawn from the material roll and output the drawn material signal during rotation.

5. The wrapping system of claim 1, wherein the controller is configured to output a wrapping cycle start signal to a duckbill actuator and determine the length of wrapping material that is drawn from the material roll after outputting the wrapping cycle start signal.

6. An agricultural baler, comprising:
    a chassis;
    a baling chamber carried by the chassis and configured to form a bale; and
    a wrapping system configured to wrap a formed bale in the baling chamber, the wrapping assembly comprising:
        a material roll configured to hold a roll of wrapping material;
        a knife assembly comprising a movable cutter that is configured to cut wrapping material that comes off the material roll;
        a sensor associated with the material roll and configured to output a drawn material signal that is indicative of wrapping material being drawn from the material roll; and
        a controller operatively coupled to the knife assembly and the sensor, the controller being configured to:
            receive the drawn material signal;
            determine a length of wrapping material that is drawn from the material roll;
            output a cut signal to the knife assembly when the drawn length of wrapping material reaches a defined length;

determine a length of wrapping material that is drawn from the material roll after outputting the cut signal; and output an excessive wrap signal when the length of wrapping material drawn after outputting the cut signal exceeds a threshold length, wherein the controller is configured such that the output excessive wrap signal prevents rotation of the material roll, and wherein the controller is configured in response to said excessive wrap signal to set the threshold length to be equal to a circumference of a forming bale or to prevent rotation of the material roll by decoupling of a power take off from a power source.

7. The agricultural baler of claim 6, wherein the controller is configured to output the excessive wrap signal such that an alarm is triggered.

8. The agricultural baler of claim 7, further comprising a display that is operatively coupled to the controller, wherein the controller is configured to output the excessive wrap signal to the display to cause the display to present a warning.

9. The agricultural baler of claim 6, wherein the sensor comprises a wheel that is configured to rotate as wrapping material is drawn from the material roll and output the drawn material signal during rotation.

10. The agricultural baler of claim 6, further comprising a duckbill assembly comprising a duckbill actuator that is operatively coupled to the controller, the controller being configured to output a wrapping cycle start signal to the duckbill actuator and determine the length of wrapping material that is drawn from the material roll after outputting the wrapping cycle start signal.

11. A method of controlling a wrapping system of an agricultural baler, the method being performed by a controller and comprising:

determining a length of wrapping material that is wrapped around a bale in a baling chamber;

outputting a cut signal to a knife assembly when a drawn length of wrapping material reaches a defined length;

determining a length of wrapping material that is wrapped around the bale after outputting the cut signal;

outputting an excessive wrap signal when the length of wrapping material wrapped around the bale after outputting the cut signal exceeds a threshold length; and setting the threshold length to be equal to a circumference of the bale.

12. The method of claim 11, wherein outputting the excessive wrap signal prevents further wrapping of wrapping material around the bale.

13. The method of claim 12, wherein outputting the excessive wrap signal triggers an alarm.

* * * * *